United States Patent [19]

Swallow et al.

[11] Patent Number: 5,100,175
[45] Date of Patent: Mar. 31, 1992

[54] TIRE TRACTION ENHANCING KIT

[76] Inventors: Carl L. Swallow; Lorraine Swallow, both of HCR 59 Box 7, Buffalo Gap, S. Dak. 57722

[21] Appl. No.: 619,595

[22] Filed: Nov. 29, 1990

[51] Int. Cl.⁵ .......................... B60S 9/00; B60B 39/00
[52] U.S. Cl. ................................... 280/757; 280/855; 291/3; 239/567
[58] Field of Search .................. 180/16; 280/757, 855, 280/856; 291/1, 13, 3, 12; 239/567

[56] References Cited

U.S. PATENT DOCUMENTS

| 1,041,011 | 10/1912 | Bryan | 239/567 |
| 1,272,352 | 7/1918 | Allen | 280/855 |
| 3,336,064 | 8/1967 | Dzaack | 291/1 |
| 3,739,729 | 6/1973 | Carlson | 280/832 |
| 3,779,324 | 12/1973 | Kreske, Jr. | 291/1 |

FOREIGN PATENT DOCUMENTS 1582922 1/1981 United Kingdom .................. 291/1

Primary Examiner—Charles A. Marmor
Assistant Examiner—Paul Dickson
Attorney, Agent, or Firm—Leon Gilden

[57] ABSTRACT

An apparatus for enhancing traction for two drive wheels of a self-propelled vehicle, wherein the kit includes a reservoir coupled to a primary conduit through selective actuation of a solenoid valve. The primary conduit is in fluid communication with a secondary conduit, wherein the secondary conduit includes a spray head positioned adjacent each drive wheel of the vehicle. The spray head includes an apertured semi-spherical spray head to disperse fluid to and adjacent the drive wheels to effect melting of snow and ice thereabout. The kit further includes a dispersion brush selectively securable about the nozzle to minimize dirt and debris intrusion into the spray head, and further includes elastomeric cap member to overlie the spray head and enclose the same during periods of non-use.

1 Claim, 4 Drawing Sheets

PRIOR ART

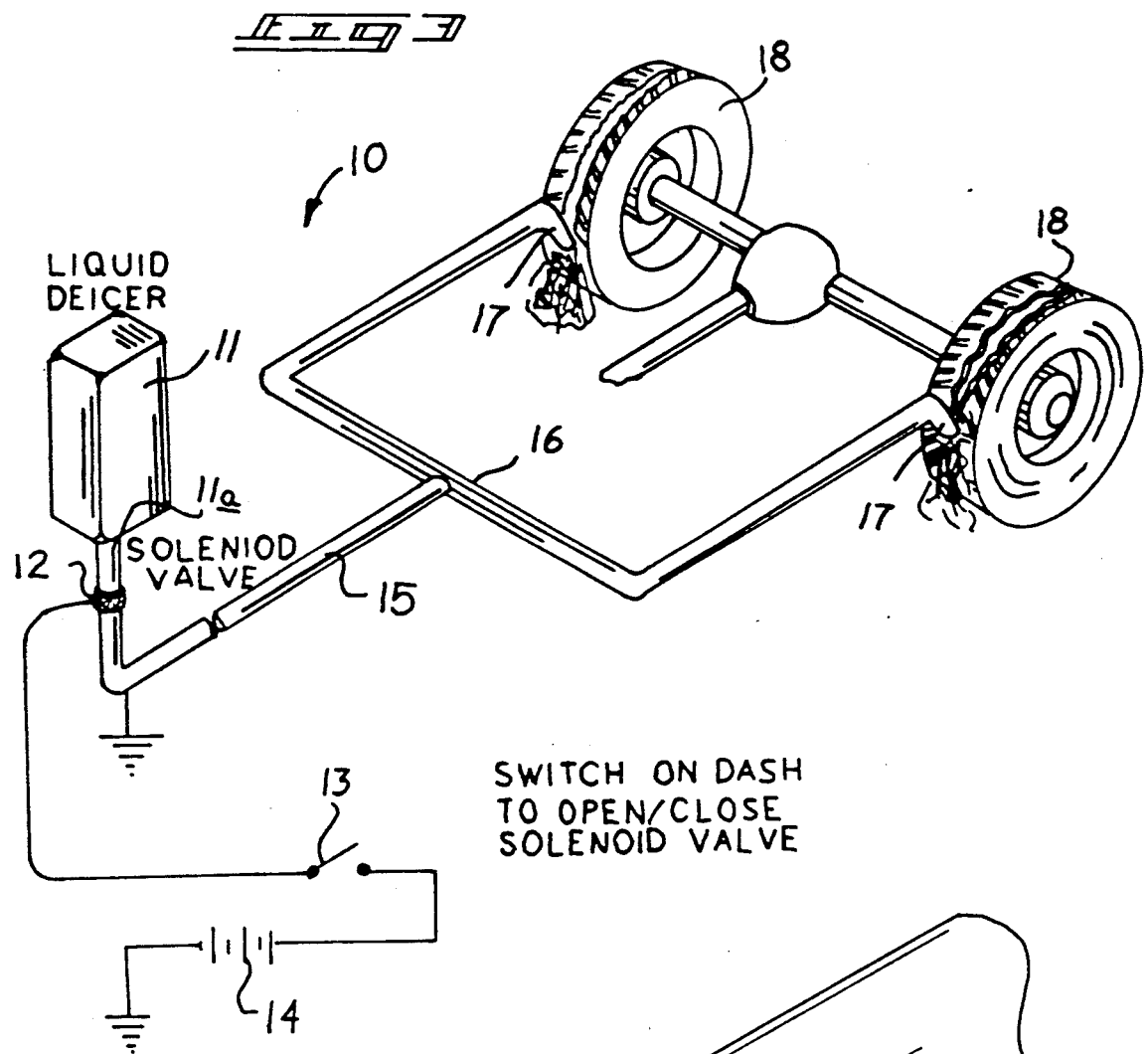
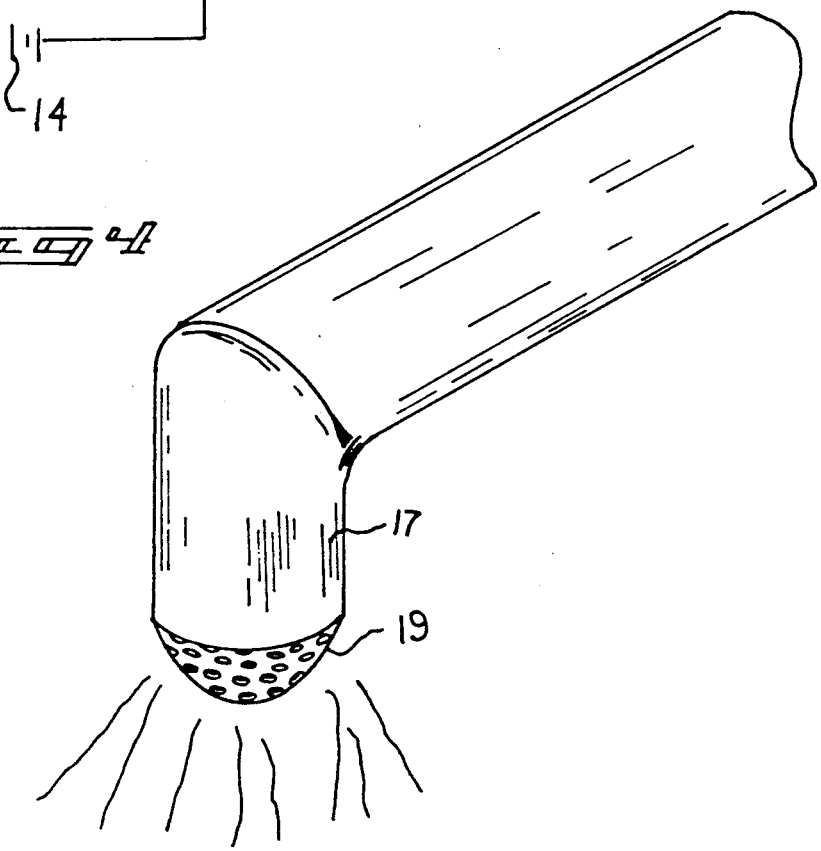

TIRE TRACTION ENHANCING KIT

BACKGROUND OF THE INVENTION

1. Field of the Invention

The field of invention relates to tire apparatus, and more particularly pertains to a new and improved tire traction enhancing kit wherein the same enhances traction from a kit, with a spray head to disperse fluid to effect melting of snow and ice.

2. Description of the Prior Art

Various traction enhancing devices have been set forth in the prior art to direct a traction enhancing component, such as salt and the like, adjacent the drive wheel structure of vehicles. The prior art has typically utilized relative complex and elaborate construction, as opposed to the instant invention setting forth a convenient and readily mounted structure available for retrofit to existing self-propelled vehicles. Examples of the prior art include U.S. Pat. No. 4,316,625 to Goon, et al. wherein a self-dispensing accessory is mounted to a vehicle utilizing a pump drive to direct a salt mixture forwardly of traction wheels of the vehicle.

U.S Pat. No. 4,747,627 to Shigeura, et al. sets forth a railway adhesion improving organization, wherein a nozzle directs sand and course particles forwardly of a drive wheel of a railway vehicle operative through a solenoid valve.

U.S. Pat. No. 4,848,510 to Ahmed sets forth a snow and ice melting organization wherein exhaust gas is directed to positions forwardly of the drive wheels to effect melting of snow and ice and enhance traction.

U.S. Pat. No. 4,668,292 to Koperdak sets forth an organization of a particular traction enhancing material, including a water scavenging agent including oxide and a parting agent such as stearate or oleate.

U.S. Pat. No. 4,063,606 sets forth an anti-hydroplaning device wherein hoses are directed ahead of traction of the wheels of a vehicle to effect the dispersal by compressed air of fluid forwardly of the vehicles to minimize hydroplaning.

As such, it may be appreciated that there continues to be a need for a new and improved tire traction enhancing kit as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of traction enhancing apparatus now present in the prior art, the present invention provides a tire traction enhancing kit wherein the same is arranged for directing an antifreeze type fluid to melt ice and snow to enhance traction of a self-propelled vehicle. As such, the general purpose of the Present invention, which will be described subsequently in greater detail, is to provide a new and improved tire traction enhancing kit Which has all the advantages of the prior art tire traction enhancing devices and none of the disadvantages.

To attain this, the present invention provides an apparatus for enhancing traction for two drive wheels of a self-propelled vehicle, wherein the kit includes a reservoir coupled to a primary conduit through selective actuation of a solenoid valve. The primary conduit is in fluid communication with a secondary conduit, wherein the secondary conduit includes a spray head positioned adjacent each drive wheel of the vehicle. The spray head includes an apertured semi-spherical spray head to disperse fluid to and adjuacent the drive wheels to effect melting of snow and ice thereabout. The kit further includes a dispersion brush selectively securable about the nozzle to minimize dirt and debris intrusion into the spray head, and further includes elastomeric cap member to overlie the spray head and enclose the same during periods of non-use.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved tire traction enhancing kit which has all the advantages of the prior art tire traction enhancing devices and none of the disadvantages.

It is another object of the present invention to provide a new and improved tire traction enhancing kit which may be easily and efficiently manufactured and marketed.

It is a further object of the present invention to provide a new and improved tire traction enhancing kit which is of a durable and reliable construction.

An even further object of the present invention is to provide a new and improved tire traction enhancing kit which is susceptible of a low cost of manufacture with regard to both materials and labor, and which accordingly is then susceptible of low prices of sale to the consuming public, thereby making such tire traction enhancing kits economically available to the buying public.

Still yet another object of the present invention is to provide a new and improved tire traction enhancing kit which provides in the apparatuses and methods of the prior art some of the advantages thereof, while simultaneously overcoming some of the disadvantages normally associated therewith.

Still another object of the present invention is to provide a new and improved tire traction enhancing kit wherein the same is arranged for applying and directing a fluid forwardly of and about each drive wheel of a self-propelled vehicle to enhance traction thereof during conditions of ice and snow.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric and diagrammatic illustration of the instant invention.

FIG. 4 is an isometric illustration of the spray head and nozzle of the instant invention.

DESCRIPTION OF THE PREFERRED EMBODIMENT

Figure 1:
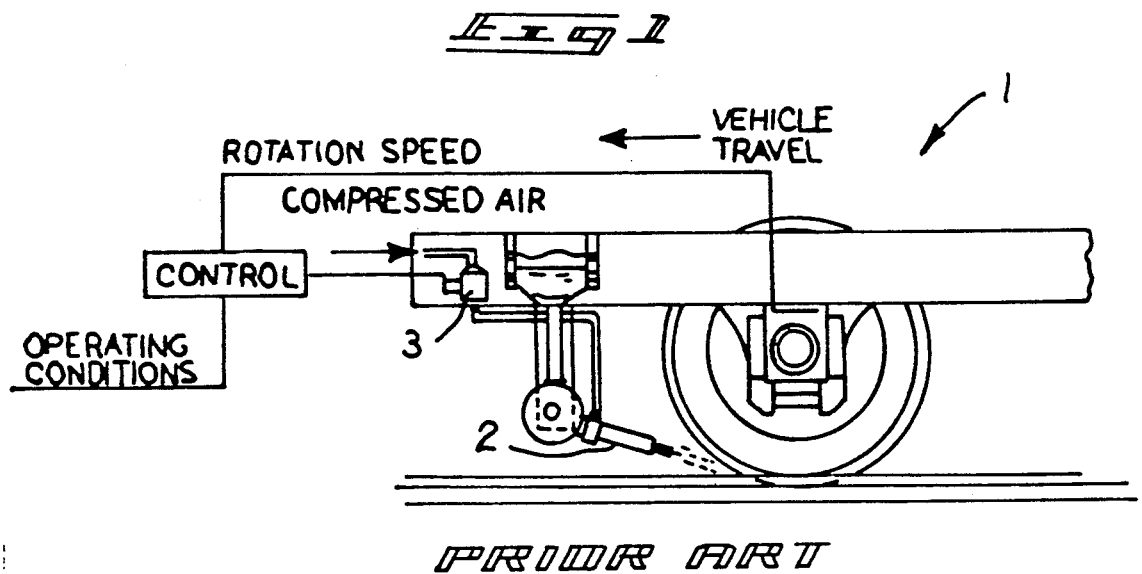
FIG. 1 is a diagrammatic illustration of a prior art drive wheel traction enhancing organization.

With reference now to the drawings, and in particular to FIGS. 1 to 8 thereof, a new and improved tire traction enhancing kit embodying the principles and concepts of the present invention and generally designated by the reference numeral 10 will be described.

FIG. 1 illustrates a prior art traction enhancing device 1, wherein a nozzle 2 is directed forwardly of a railroad vehicle wheel to direct a particular stream forwardly thereof and operative through a solenoid valve 3, in a manner as set forth in U.S. Pat. No. 4,747,627. The device 4, as set forth in FIG. 2 in the prior art, utilizes a nozzle 5 in communication with a reservoir 6 that through a pump mechanism directs a particulate salt type stream forwardly of the vehicular wheel, as set for&h in U.S. Pat. No. 4,316,625.

Figure 2:
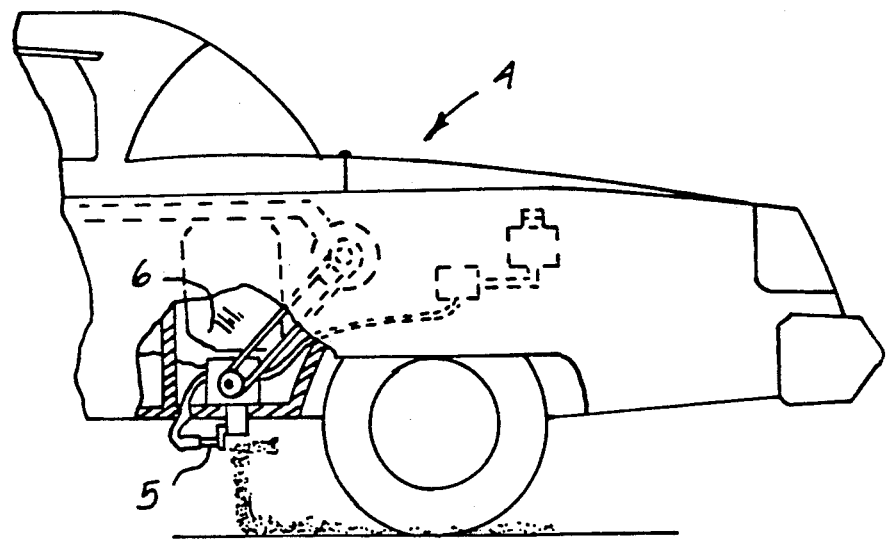
FIG. 2 is an orthographic side view, taken in elevation, partially in section, of a further example of a prior art drive wheel traction enhancing organization.
Figure 5:
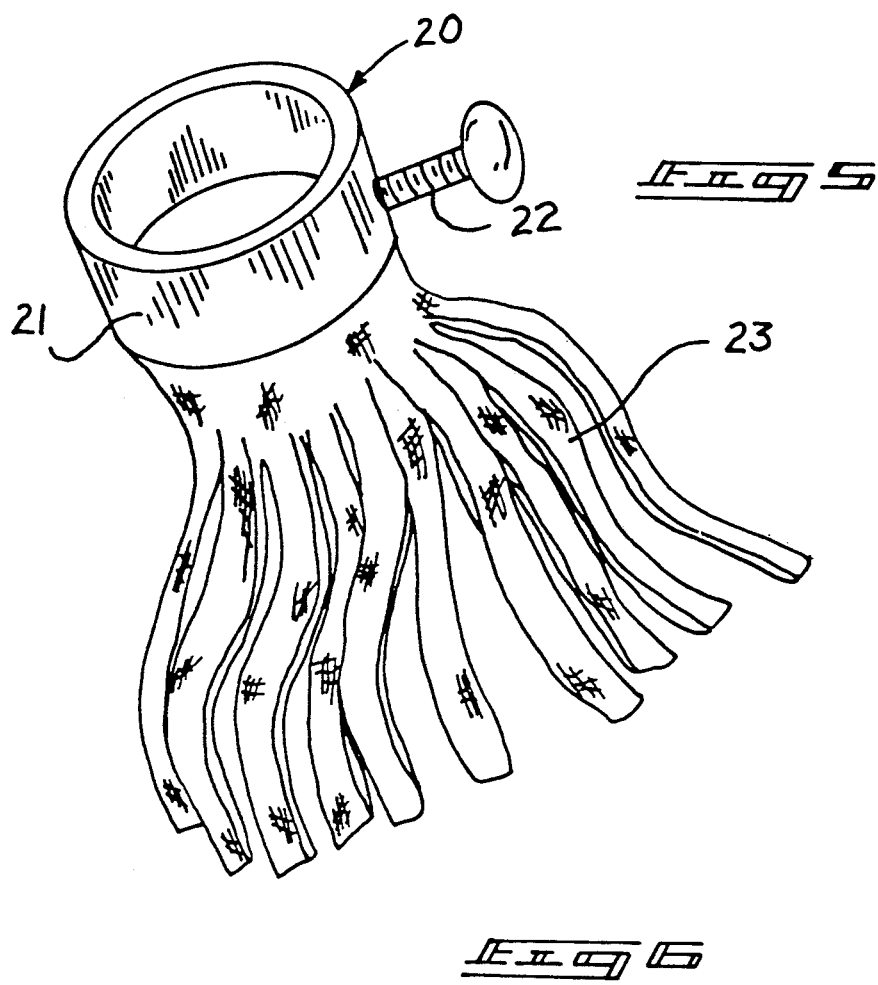
FIG. 5 is an isometric illustration of a brush member utilized by the instant invention.
Figure 6:
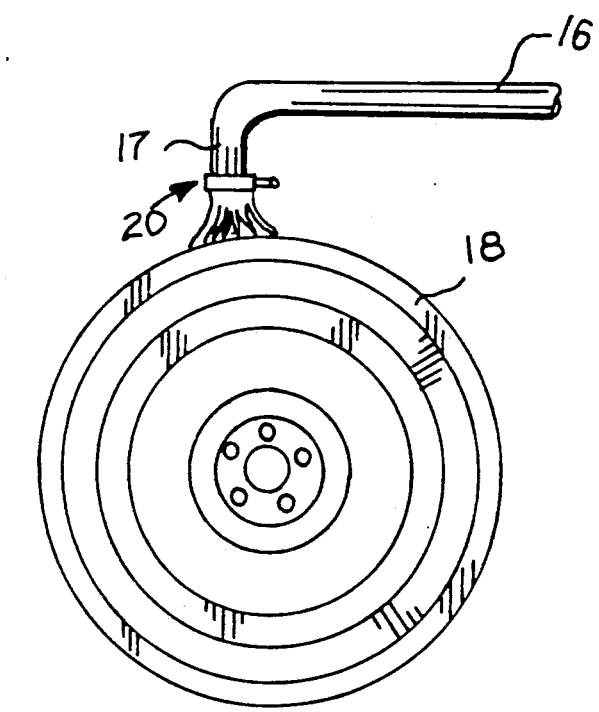
FIG. 6 is an orthographic side view, taken in elevation, of the brush member in use with the instant invention.
Figure 7:
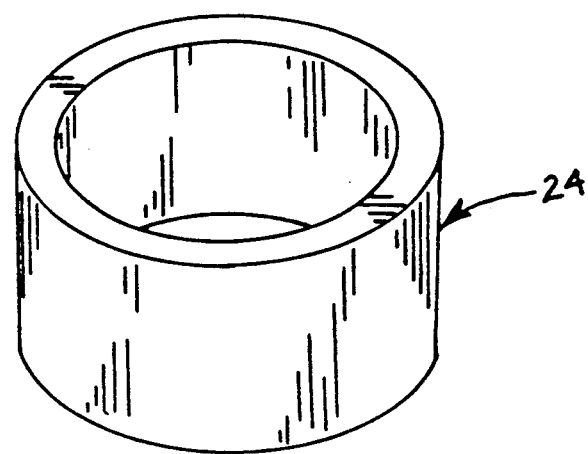
FIG. 7 is an isometric illustration of an elastomeric covering cap utilized by the instant invention.
Figure 8:
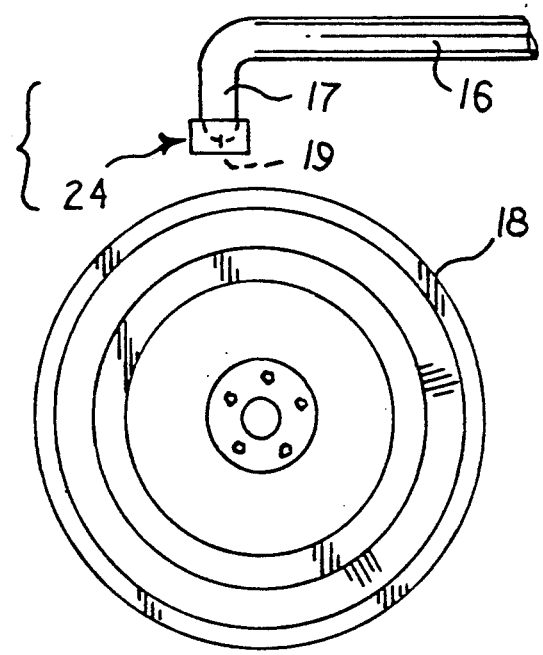
FIG. 8 is an orthographic side view, taken in elevation, of the cap member, as illustrated in FIG. 7, mounted to the spray nozzle of the instant invention.

More specifically, the tire traction enhancing kit 10 of the instant invention essentially comprises a fluid reservoir 11 mounted within an associated self-Propelled vehicle, in a manner as illustrated in FIG. 2, utilizing a reservoir conduit 11a operative through a selectively actuated solenoid valve 12 to direct a liquid de-icer contained within the fluid reservoir 11 into a primary conduit 15. A switch 13 remotely positioned within the vehicle and operative through a battery member 5 is provided to effect selective actuation of the solenoid valve 12. The primary conduit 15 directs fluid into a secondary conduit 16 that branches into a plurality of spray nozzles 17 in fluid communication with the secondary conduit 16. With each spray nozzle 17 positioned somewhat forwardly of and overlying an associated vehicular drive tire 18.

FIG. 4 illustrates the spray nozzle 17 utilized by the instant invention that includes an apertured hemispherical spray head cap 19 to direct a plurality of fluid streams from the conduit 17 relative to each drive tire 18. To enhance application of and distribution of the spray over an associated drive tire 18, an applicator 20 is provided. Each applicator 20 is selectively securable to each spray nozzle 17 in surrounding relationship relative to the spray head cap 19 and includes a rigid collar 21, with a threaded fastener member 22 diametrically directed through the collar for securement to each spray nozzle 17. A cylindrical brush member 23 circumferentially fixed to a lower terminal end coextensively thereof of the rigid collar 21 is provided to enhance the application of the aforenoted spray from the fluid reservoir 11, as well as preventing accumulation of dirt within the spray head cap 19. Further, during periods of non-use, an elastomeric cup-shaped cap 24 is provided for frictional securement overlying the spray head cap 19. As is understood, the cup-shaped cap 24 defines a normally unbiased internal diameter somewhat less than that of an external diameter defined by each spray nozzle 17 and each associated hemispherical spray head cap 19.

Fluid utilized as a liquid de-icer includes ethylene clycol and other clycol based solutions and compounds, as well as other suitable de-icing fluids.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A tire traction enhancing kit for securement to a self-propelled vehicle, including a plurality of drive wheels, wherein the kit includes,
   a fluid reservoir, with a fluid reservoir conduit directed outwardly therefrom, and
   a solenoid valve mounted to the fluid reservoir conduit to effect selective fluid flow from the fluid reservoir conduit, and a switch means remotely positioned relative to the solenoid valve for effecting selective actuation of the solenoid valve. and a primary conduit in fluid communication with the fluid reservoir conduit through the solenoid valve, and a secondary conduit in fluid communication with the primary conduit, wherein the secondary conduit includes a plurality of spray nozzles with at least one spray nozzle positioned overlying an associated drive wheel, wherein said at least one spray nozzle is arranged for directing a fluid contained within the fluid reservoir through the at least one spray nozzle, with at least one of said spray nozzles positioned in operative association with a drive wheel, and wherein each spray nozzle includes a hemispherical apertured cap fixedly mounted overlying each terminal end of a spray nozzle to direct a fluid spray relative to each drive wheel, and further including an applicator member selectively mounted to each spray nozzle overlying each respective hemispherical cap, wherein each applicator includes a rigid collar slidably mounted overlying each spray nozzle, wherein each collar includes a fastener member diametrically directed through each rigid collar for securement of the collar to the spray nozzle, and the applicator further including a cylindrical brush member fixedly mounted to a lower terminal end of the collar in coextensive relationship to the lower terminal end of each collar, and wherein the kit further includes an elastomeric cup-shaped cap for selective securement overlying each hemispherical cap, wherein each elastomeric cup-shaped cap defines an internal diameter substantially less than a hemispherical cap diameter defined by each hemispherical hemispherical cap to require stretching of each elastomeric cup-shaped cap to overlie each hemispherical hemispherical cap.

* * * * *